(12) United States Patent
Houssat et al.

(10) Patent No.: US 9,751,501 B2
(45) Date of Patent: Sep. 5, 2017

(54) CONNECTION ASSEMBLY FOR A WIPING SYSTEM OF A MOTOR VEHICLE

(75) Inventors: Stéphane Houssat, Blanzat (FR); Loic Roussel, Salledes (FR); William Terrasse, Vic-Le-Comte (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 806 days.

(21) Appl. No.: 14/344,244

(22) PCT Filed: Aug. 8, 2012

(86) PCT No.: PCT/EP2012/065528
§ 371 (c)(1),
(2), (4) Date: Oct. 14, 2014

(87) PCT Pub. No.: WO2013/037572
PCT Pub. Date: Mar. 21, 2013

(65) Prior Publication Data
US 2015/0074934 A1    Mar. 19, 2015

(30) Foreign Application Priority Data
Sep. 12, 2011 (FR) .................................. 11 58091

(51) Int. Cl.
B60S 1/40 (2006.01)
B60S 1/38 (2006.01)

(52) U.S. Cl.
CPC .......... B60S 1/3868 (2013.01); B60S 1/4045 (2013.01); B60S 1/4048 (2013.01); B60S 1/4064 (2013.01); *B60S 2001/4051* (2013.01)

(58) Field of Classification Search
CPC .... B60S 1/3849; B60S 1/3851; B60S 1/3858; B60S 1/4045; B60S 1/4048; B60S 1/3868;
(Continued)

(56) References Cited

U.S. PATENT DOCUMENTS 7,621,016 B2   11/2009   Verelst et al.
7,669,276 B2    3/2010   Verelst et al.
2006/0248675 A1* 11/2006  Vacher .................. B60S 1/3849
                                              15/250.32

FOREIGN PATENT DOCUMENTS

CN          1714015 A      12/2005
DE   10 2008 000 933 A1    10/2009
(Continued)

OTHER PUBLICATIONS

Office Action issued in corresponding Chinese Application No. 201280055536.2 dated Jul. 3, 2015 (14 pages).
(Continued)

*Primary Examiner* — Gary Graham
(74) *Attorney, Agent, or Firm* — Osha Liang LLP

(57) ABSTRACT

According to the invention, the assembly comprises a mechanical connector provided with two cylindrical protuberances and an adaptor (50) with two side walls (54, 55) each having a lateral orifice (54A, 55A), wherein the end of each cylindrical protuberance has at least one portion which is inclined in relation to the insertion direction of said mechanical connector, towards the inside of the adapter (50), and a portion (54B) of each side wall (54) has a cavity (54B), of which at least one inner surface (54C) is inclined in an increasing fashion from the end of said side wall (54) up to said corresponding lateral orifice (54A), and of which at least one lateral delimitation (54D, 54E) is inclined in relation to the plane formed by the axis of said corresponding lateral orifice (54A) and said insertion direction, in a decreasing fashion from the end of said side wall (54) up to said corresponding lateral orifice (54A).

9 Claims, 4 Drawing Sheets

(58) Field of Classification Search
CPC ............... B60S 1/3865; B60S 1/4064; B60S 2001/4051
USPC .................................................... 15/250.32
See application file for complete search history.

(56) References Cited

FOREIGN PATENT DOCUMENTS

| | | |
|---|---|---|
| DE | 10 2009 029458 A1 | 3/2011 |
| FR | 2 847 221 A1 | 5/2004 |

OTHER PUBLICATIONS

International Search Report for corresponding International Application No. PCT/EP2012/065528, mailed Sep. 5, 2012 (4 pages).

\* cited by examiner

CONNECTION ASSEMBLY FOR A WIPING SYSTEM OF A MOTOR VEHICLE

The present invention concerns an assembly for a wiping system.

Although not exclusively, this type of wiping system is intended for use in a motor vehicle, in particular to allow wiping of the windows.

Motor vehicles are normally fitted with wiper systems which wash the windscreen and prevent the driver's vision of his environment from being obstructed. These wipers are conventionally driven by an arm performing an angular to-and-fro movement, and comprise extended blades which themselves carry rubbers made from an elastic material. These rubbers rub against the windscreen and remove water by moving it outside the driver's field of vision.

The blades are made in the form of either, in a conventional version, articulated spreader bars which hold the rubber at several separate points, or in a more recent version known as "flat blade", a semi-rigid assembly which holds the rubber over its entire length.

In both of these versions, the blade is attached to the rotating arm of the wiper system:
  firstly by an end piece which extends the arm at its upper end, and
  secondly by an assembly comprising a mechanical connector integral with the blade (clamped onto the spreader bar or directly onto the flat blade), and an adapter, an intermediate part which allows the mechanical connector to be fixed to the end piece and hence to the arm.

To ensure the housing at least partly—of the mechanical connector inside the adapter, it is already known firstly to provide said adapter with two deformable side walls each having a lateral orifice, and secondly to provide said mechanical connector with two studs. Each stud of the mechanical connector is associated with a lateral orifice of the adapter. Thus each stud is able to be inserted in the corresponding lateral orifice of the adapter along a predetermined insertion direction.

Documents U.S. Pat. No. 7,669,276 and U.S. Pat. No. 7,621,016 disclose such assemblies for a wiping system, in which the adapter and the mechanical connector are provided with lateral orifices and studs respectively, to allow the housing of said mechanical connector in said adapter.

More precisely, in both documents, the two lateral orifices arranged opposite each other in the two side walls of the adapter, and the two studs, each have a cross-section of circular form. Furthermore, the portion of each side wall, through which the corresponding stud is intended to pass when inserted in the corresponding lateral orifice, is an extension of the lateral orifice up to the end of the side wall. Thus the stud can be inserted into the corresponding lateral orifice by sliding said button along the extension of this lateral orifice.

However such an extension of the lateral orifice makes the connection between said lateral orifice and the corresponding stud unstable.

Thus it is desirable for each side wall of the adapter not to have such extensions, but on the contrary the lateral orifices should be closed, such that the corresponding stud is fixed therein in a stable manner.

In this case, the connection of the adapter to the mechanical connector requires the studs to be arranged perfectly along the predetermined insertion direction, which requires avoiding any translation of the adapter in relation to the mechanical connector, and any rotation of said adapter in relation to said mechanical connector. Such precautions are liable to be difficult to take in the case of automated installation of the wiping system. These precautions also complicate the mounting of the blade carrying the connector on the arm which carries the adapter, when a user wishes to replace the worn blades, where such constraints hinder the ergonomics which the user must be offered.

The object of the present invention is to remedy these drawbacks by proposing the prevention of any translation and rotation of the adapter in relation to the mechanical connector during their connection, wherein the cylindrical protuberances can easily be guided and aligned into the corresponding lateral orifices.

To this end, the invention proposes an assembly for a wiping system, said wiping system comprising a blade and an arm which is extended by an end piece, said assembly comprising a mechanical connector integral with said blade, and an adapter able to be connected to said end piece and to said mechanical connector, said adapter comprising two deformable side walls each with a lateral orifice, said mechanical connector comprising two cylindrical protuberances via which said mechanical connector is able to be housed at least partly inside said adapter along an insertion direction, characterized in that:
  the end of at least one cylindrical protuberance has at least one portion which is inclined in relation to said insertion direction, and in that
  at least one side wall has a cavity comprising an inner surface which is inclined in increasing fashion from an end of said side wall up to said corresponding lateral orifice.

Thus thanks to the present invention, the different inclines made in the cavity provided in each side wall, at the level of the portion on which the corresponding cylindrical protuberance is intended to rest on its insertion, allows said cylindrical protuberance to be guided and aligned into the lateral orifice. In particular, a translation of the mechanical connector in relation to the adapter can be permitted, firstly because of the play created by the provision of the lateral orifices, and secondly because of the incline of the lateral delimitations of the cavities (translation perpendicular to the insertion direction and the axis of the lateral orifices), together with the incline of the inner surface of the cavities (translation along the axis of the lateral orifices). Also a rotation of the mechanical connector in relation to the adapter is permitted, because of said incline of the inner surface of the cavities and the incline of the ends of the cylindrical protuberances.

In this way, each cylindrical protuberance can easily be guided towards the corresponding lateral orifice, even in the presence of a defect in translation and/or rotation of the mechanical connector in relation to the adapter. Furthermore, each lateral orifice can be fully closed, for greater stability and security of the connection between the mechanical connector and the adapter.

According to a first characteristic, the cavity comprises lateral delimitations which are inclined in relation to the plane formed by the axis of said corresponding lateral orifice and said insertion direction, in a decreasing fashion from the end of said side wall up to said corresponding lateral orifice.

Preferably the lateral orifices of the adapter are arranged facing each other on a common axis.

Similarly, cylindrical protuberances of the mechanical connector are preferably arranged facing each other on a common axis which lies parallel to, and advantageously coincident with, the common axis of the lateral orifices of the adapter.

In a particular embodiment of the cylindrical protuberances of the mechanical connector and the lateral orifices of the adapter, these each have a circular cross-section.

Advantageously, the inner inclined surface of the cavity provided in each side wall and the lateral delimitations of said cavity are symmetrical in relation to a plane passing through the axis of the corresponding lateral orifice and the insertion direction of said cylindrical protuberances.

Further advantageously, the mechanical connector comprises a central part from which two cylindrical protuberances protrude, a cylindrical shoulder being interposed between the central part and each cylindrical protuberance.

According to one embodiment, the deformable character of at least one side wall results from at least one groove made in the thickness of the side wall.

It is noted in particular that the adapter comprises at least two locking elements, each consisting of a telescopic button arranged at one end of a flexible tab, to lock the adapter in relation to the end piece, said tabs being arranged so as to overlap on operation of the telescopic button.

The present invention also concerns a wiping system comprising a blade, an arm extended at its outer end by an end piece, and an assembly comprising a mechanical connector integral with the blade, and an adapter able to be connected to said end piece and to said mechanical connector, said adapter comprising two deformable side walls each with a lateral orifice, said mechanical connector comprising two cylindrical protuberances via which said mechanical connector is able to be housed at least partly inside said adapter, each cylindrical protuberance being able to be inserted in the corresponding lateral orifice along a predefined insertion direction by deformation of the corresponding side wall, which is characterized in that:
  the end of each cylindrical protuberance has at least one portion which is inclined in relation to said insertion direction, towards the inside of said adapter, and
  the portion of each side wall, on which the corresponding cylindrical protuberance is intended to rest when inserted in the corresponding lateral orifice, has a cavity, at least one part of the inner surface of which is inclined in an increasing fashion from the end of said side wall up to said corresponding lateral orifice, and of which at least one part of the lateral delimitation is inclined in relation to the plane formed by the axis of said corresponding lateral orifice and said insertion direction, in decreasing fashion from the end of said side wall up to said corresponding lateral orifice.

The figures of the attached drawing will show how the invention may be implemented. On the figures, identical references designate similar technical elements.

In the description below, the terms "longitudinal" and "lateral" refer to the orientation of the arm on which the wiper blade is mounted. The longitudinal direction corresponds to the main axis of the arm, while lateral orientations correspond to orientations perpendicular to the axis of the arm in its rotation plane. For longitudinal directions, the terms "outer" and "inner" apply in relation to the centre of rotation of the wiper arm. Also, the directions marked "upper" and "lower" correspond to orientations perpendicular to the plane of rotation of the arm.

Figure 1:
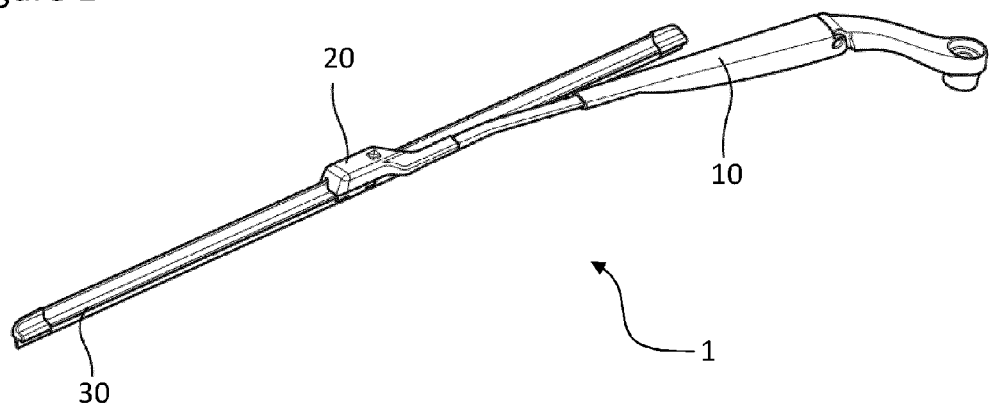
FIG. 1 is a diagrammatic, perspective view of a wiping system according to the prior art.
Figure 2:
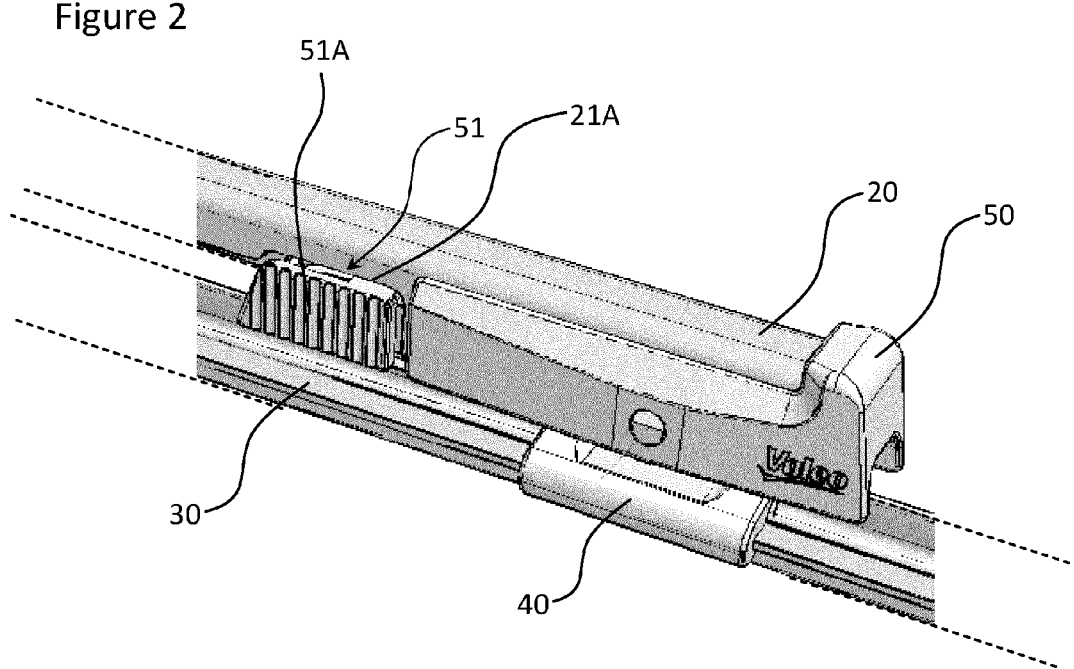
FIG. 2 is an enlarged, diagrammatic, perspective view of a portion of a wiping system according to the present invention, at the level of which the mechanical connector, the adapter and the end piece are assembled.
Figure 3:
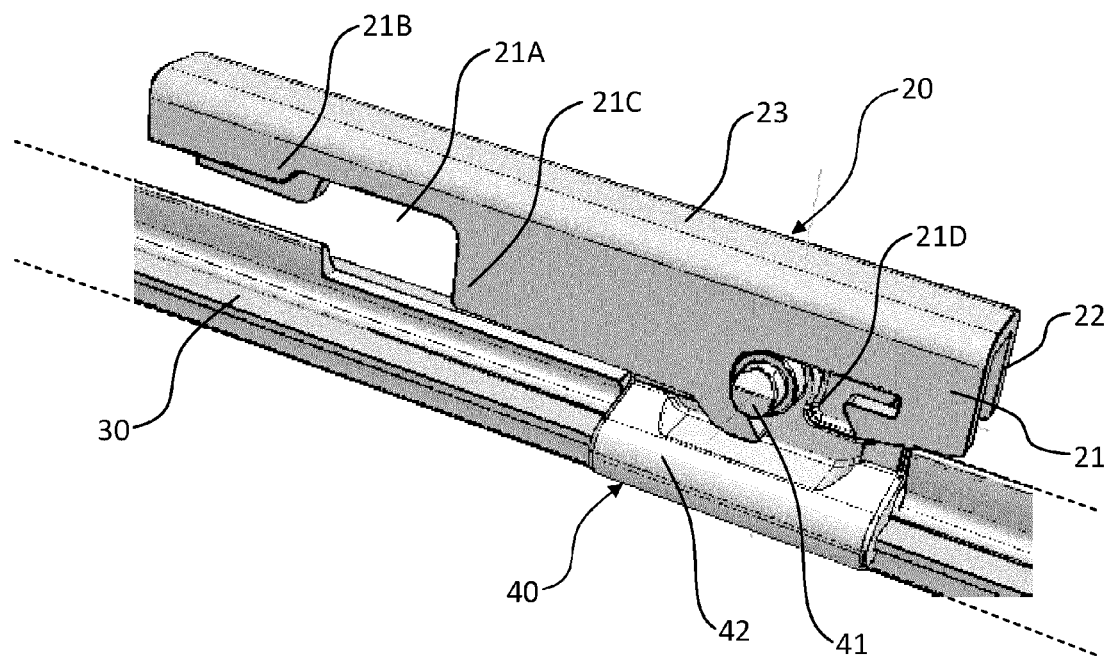
FIG. 3 is a diagrammatic view similar to that in FIG. 2, which illustrates the assembly of the mechanical connector to the end piece.

With reference to FIGS. 1 to 3, we see a wiping system 1 conventionally comprising an arm 10, extended at its outer end by an end piece 20 which is fixed on the inside by crimping to said arm 10. The assembly according to the invention is formed by an adapter 50 and a mechanical connector 40. The end piece 20 is housed in an inner volume of the adapter 50 and covers the mechanical connector 40, via which said adapter 50 carries the blade 30.

On FIG. 2, we see that the end piece 20 is intended to be inserted in the adapter 50 by a translation movement along a longitudinal axis, to reach the usage position where it is positioned at a stop against a shape of the end piece 20 with which it is intended to cooperate. The adapter 50 is then fixed reversibly by means of two locking elements 51 and 52 comprising telescopic buttons 51A and 52A, which each cooperate with a recess provided to this end in the side branches of the end piece 20.

As shown on FIG. 3, the end piece 20 on the outside has an inverted U-shape, comprising the two side branches 21 and 22 extending in the direction of the glass, and a base 23 in its upper part. Two openings or recesses (21A for branch 21) are produced in the two side branches 21 and 22, in which the telescopic buttons 51A and 52A of the locking elements 51 and 52 of the adapter 50 are able to be accommodated. Each of the side branches 21 and 22 also has two translation stops (21B and 21C for the branch 21) against the telescopic buttons 51A and 52A, so as to block any translation of the adapter 50 in relation to the arm in two opposing directions. Also each of the side branches 21 and 22, on the side opposite the openings (21A for branch 21) for receiving the locking elements 51 and 52, has an opening or recess (21D for branch 21) at which the end piece is directly connected to the mechanical connector 40, the latter comprising to this end two buttons (of which only one, designated reference 41, is shown on FIG. 3) with a form complementary to said openings (21D for branch 21). Thus the end piece 20 is fixed firstly to the adapter 50 and secondly to the connector 40, which ensures the mechanical solidity of the assembly forming the wiper system according to the invention. More generally, these protuberances are of circular cross-section and protrude from the mechanical connector 40.

Figure 6:
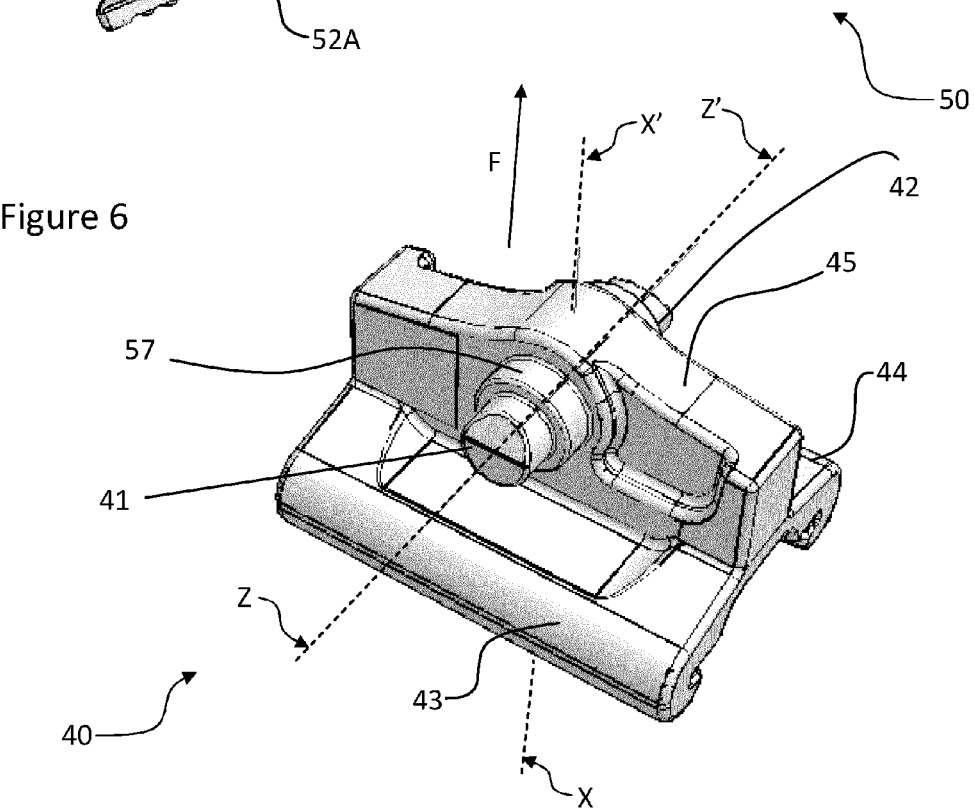
FIGS. 6 and 7 are two diagrammatic views, in two different orientations, of the mechanical connector of FIGS. 2 and 3.

The mechanical connector 40 is fixedly attached to the blade 30 via two shoulders 46A and 46B arranged in its lower part (FIG. 7), so as to ensure the transmission of the mechanical force from the arm 10 to the blade 30. The mechanical connector 40 also has a central part 45 surrounded on both sides in its lower part by two lateral flanks 43 and 44, which extend for example perpendicular to a plane of symmetry of the central part 45 (FIG. 6).

Figure 4:
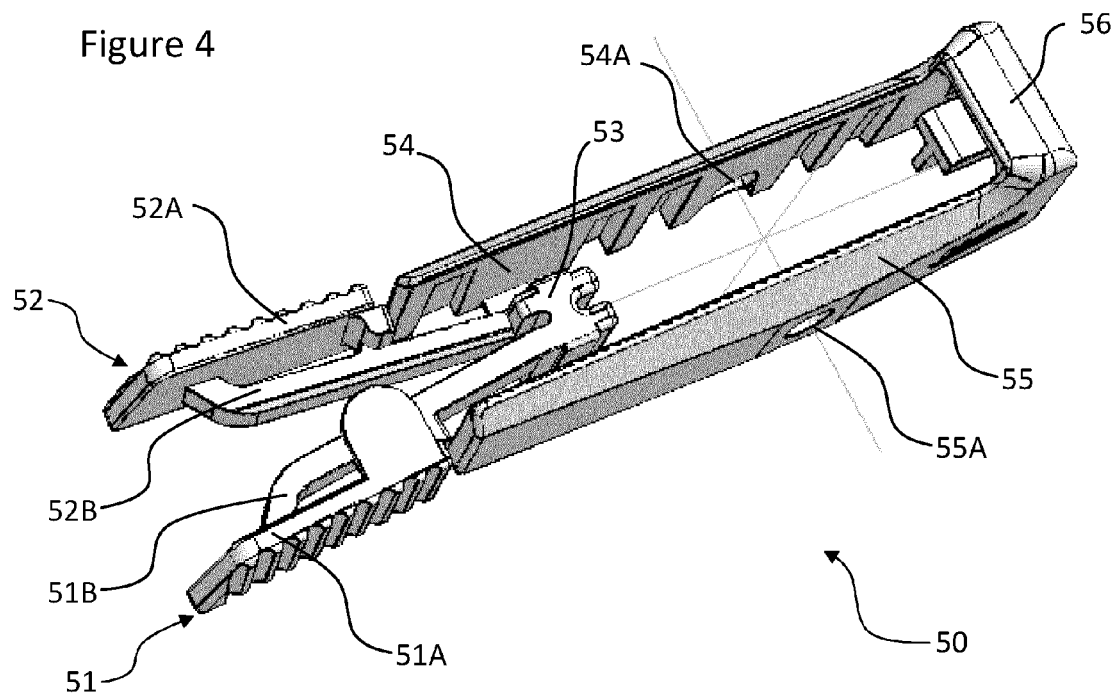
FIGS. 4 and 5 are two diagrammatic views, in two different orientations, of the adapter in FIG. 2.
Figure 5:
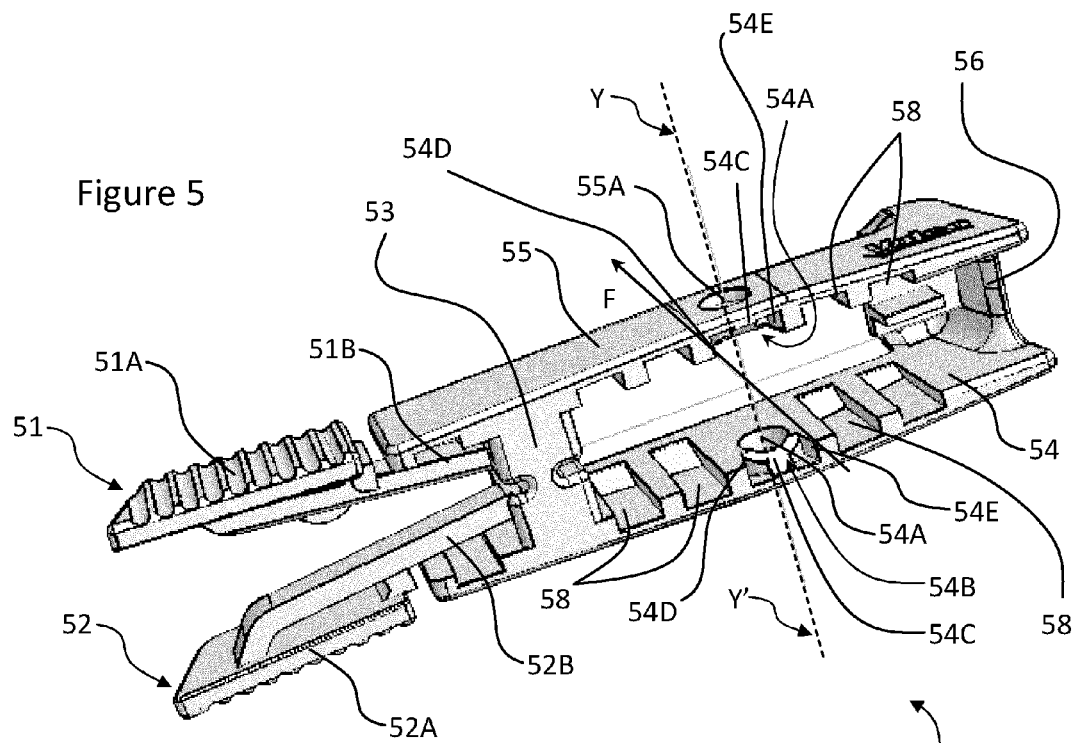

With reference now to FIGS. 4 and 5, we see the detail of the adapter 50. The adapter 50 has a cap shape complementary to the outer volume of the end piece 20, wherein the latter comes to rest in an inner volume limited by the adapter 50. Two side walls 54 and 55 are attached by a bridge 56.

The adapter 50 also comprises two locking elements 51 and 52, each having the form of telescopic buttons 51A and 52A fixed at the end of flexible tabs 51B and 52B. These locking elements 51 and 52 are intended to allow the adapter 50 to be fixed in relation to the end piece 20, by cooperating respectively with recesses (including recess 21A) made in the side branches 21 and 22 of the end piece 20 (FIG. 3).

The two locking elements 51 and 52 are arranged facing each other. The concept of "facing" means that at least a portion of a first locking element 51 is situated in the extension of a portion of a second locking element 52. In other words, the invention covers the case where the two locking elements are mutually offset in the longitudinal direction.

According to a preferred embodiment, the two locking elements 51 and 52 are arranged facing each other and opposite in relation to a longitudinal axis of the adapter 50. Advantageously, the telescopic buttons 51A and 52A therefore face each other.

The locking elements 51 and 52 are arranged such that their respective flexible tabs 51B and 52B and their telescopic buttons 51A and 52A move closer together when the adapter 50 is fitted on the end piece 20. Thus by a simple squeezing of the two telescopic buttons 51A and 52A, the two locking elements 51 and 52, which are initially arranged in a nominal position in which the end piece 20 is not inserted, can be brought together so as to allow them to pass into recesses (including recess 21A). Then when these recesses (including recess 21A) are arranged complementary in relation to the two telescopic buttons 51A and 52A, the two telescopic buttons 51A and 52A can be released to allow blockage of the end piece 20 inside the adapter 50.

Thus the flexible tabs 51B and 52B deform in a plane, called the flexion plane, and are arranged in relation to each other such that the flexion plane of the first flexible tab is separate from that of the second flexible tab, wherein these flexion planes can also be parallel to each other. It is noted that the flexible tabs are connected together by a hinge 53 which has an H-shaped cross-section, wherein a flexion axis of the tabs passes through the hinge 53.

In accordance with the present invention, the side walls 54 and 55 of the adapter 50 are deformable and provided respectively with two lateral orifices 54A and 55A with a common axis Y-Y' (FIG. 5). These lateral orifices 54A and 55A are intended to allow fixing of the adapter 50 to the mechanical connector 40, and form a rotation axis between the blade 30 and the arm 10 when the wiping system is assembled. Thus the blade 30 has at least one degree of freedom in rotation in relation to the arm 10, in particular in relation to the end piece 20, to allow said blade 30 to follow the curvature of the screen to be wiped. In practice, each lateral orifice is a cylindrical hole made through the side wall of the adapter. In another variant, this orifice can be blind in the sense that it does not pass right through the side wall of the adapter.

The side walls 54 and 55 extend between the bridge 56 and the hinge 53, and have a smooth outer face and an inner face in which grooves 58 are provided, which locally reduce the thickness of the side wall. Such an arrangement is an exemplary embodiment of the deformable nature of these walls, but the invention covers all other solutions allowing the wall to deform on passage of the mechanical connector 40, then to resume its rest position.

Figure 7:
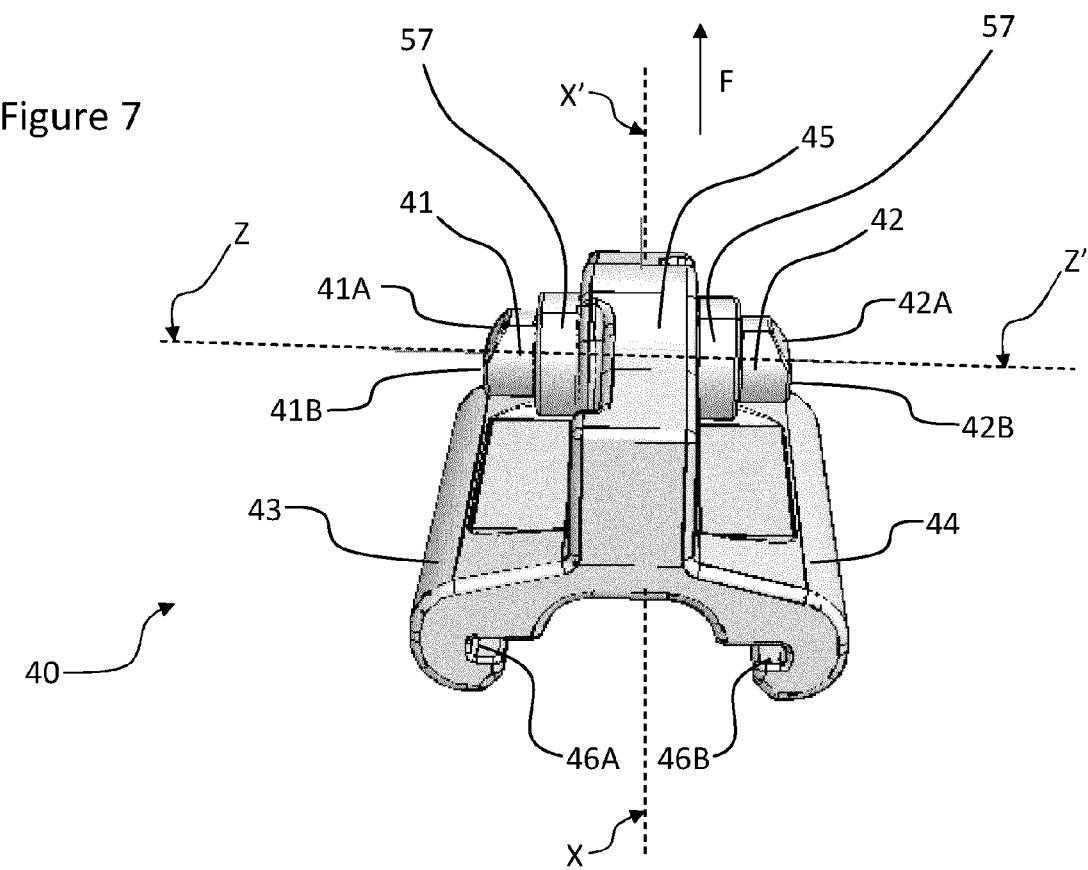

With reference now to FIGS. 6 and 7, the mechanical connector 40 comprises two cylindrical protuberances 41 and 42, via which it is able to be at least partially housed and fixed inside the adapter 50. More precisely, these cylindrical protuberances 41 and 42 protrude on either side of the central part 45 of the mechanical connector 40, the two cylindrical protuberances 41 and 42 being opposed to each other and arranged on a common axis Z-Z'. The form and dimensions of the cylindrical protuberances 41 and 42 are such that they are able to be inserted respectively in the corresponding lateral orifices 54A and 55A, along the same predefined insertion direction F, corresponding to an insertion axis X-X' as shown on FIGS. 6 and 7.

According to one exemplary embodiment, a cylindrical shoulder 57 is interposed between the central part 45 and each cylindrical protuberance 41 and/or 42. This cylindrical shoulder 57 is intended to cooperate with the recess 21D made in the side branches 21 and/or 22 of the end piece 20. It is thus possible to separate the functions, wherein the cylindrical shoulder 57 serves to allow rotation of the blade in relation to the arm when the wiping system is functioning, while the cylindrical protuberances 41 and 42 serve to ensure the mechanical support between the mechanical connector 40 and the adapter 50. Finally it is noted that, in one exemplary embodiment, the external diameter of the cylindrical shoulder 57 is greater than the external diameter of the cylindrical protuberance originating from the respective cylindrical shoulder.

Thus the mechanical connector 40 can be inserted in the adapter 50 in the insertion direction F, the cylindrical protuberances 41 and 42 then causing the deformation of the side walls 54 and 55 until these are housed in the lateral orifices 54A and 55A, the side walls 54 and 55 then resuming their nominal form, referred to above as the rest position, since the cylindrical protuberances 41 and 42 are no longer resting thereon, such that said cylindrical protuberances are perfectly blocked in said orifices.

According to the present invention, the end of each of the cylindrical protuberances 41 and 42 has at least one portion or face, marked 41A and 42A in the upper part of this end, which is inclined in relation to said insertion direction F, towards the inside of the adapter 50. The other portion of this end (41B and 42B) may remain flat, parallel to the insertion direction F. This inclined face is made on the end face of the button, i.e. that which comes to rest against the side walls of the adapter 50 on insertion of the mechanical connector 40 in the adapter 50. The direction of incline of this inclined face 41A or 42A is such that the plane which passes through this inclined face crosses direction X-X' above the central part 45.

Furthermore, the portion (FIG. 5) of each side wall 54, 55 on which the corresponding cylindrical protuberance 41, 42 is intended to rest when inserted in the corresponding lateral orifice 54A, 55A, has a cavity 54A, 54B. These cavities 54A and 54B are arranged in the thickness of the side wall concerned, at a distance substantially equivalent to that of the bridge 56 and the hinge 53. These cavities 54A and 54B each have an inner surface 54C and two delimitations or side sections 54D and 54E formed by the thickness of the side wall 54, 55 which receives said cavity 54A, 54B.

In accordance with the present invention, at least one part of this inner surface 54C—and advantageously all of this inner surface 54C—is inclined in an increasing fashion from the end of said side wall 54, 55 up to the corresponding lateral orifice 54A, 55A. In other words, the inner surface 54C forms part of a plane which crosses the insertion direction F above the adapter 50, i.e. from the side opposite the glazed surface in relation to the adapter 50.

Also at least parts of the lateral delimitations 54D and 54E are inclined in relation to the plane formed by the axis of the corresponding lateral orifice and the insertion direction F, in a decreasing fashion from the end of said side wall 54 up to the corresponding lateral orifice 54A. In other words, the two lateral delimitations 54D and 54E associated with a cavity form part of a cone, the virtual tip of which is placed above the adapter, in the definition indicated above.

Therefore thanks to these inclines of said cavities and the incline provided at the end of the cylindrical protuberances, the cylindrical protuberances 41 and 42 of the mechanical connector 40 can be guided towards the corresponding lateral orifices 54A and 55A of the adapter 50, even when said mechanical connector is inserted skewed in said adapter 50, in other words by being initially translated or rotated in relation to the insertion selection F, along the insertion axis X-X'.

Also, to guide the mechanical connector 40 better on its insertion into the adapter 50, it may be provided that the inner surface 54C of the cavity provided in each side wall, and the lateral delimitations 54D and 54E of each cavity, are symmetrical in relation to the plane formed by the axis of the corresponding lateral orifice 54A or 55A and the insertion direction F of said cylindrical protuberances 41 and 42.

It is also found that the inclined face 41A or 42A of each cylindrical protuberance 41 or 42 is oriented at a similar angle, advantageously identical to the angle formed by the plane passing through the inner surface 54C.

The invention claimed is:

1. An assembly for a wiping system, said wiping system comprising a blade and an arm which is extended by an end piece, said assembly comprising:
   a mechanical connector integral with said blade; and
   an adapter able to be connected to said end piece and to said mechanical connector, said adapter comprising two deformable side walls each with a lateral orifice, said mechanical connector comprising two cylindrical protuberances via which said mechanical connector is able to be housed at least partly inside said adapter along an insertion direction, wherein:
   an end of at least one cylindrical protuberance has at least one portion which is inclined in relation to said insertion direction, and
   at least one side wall has a cavity comprising an inner surface which is inclined in increasing fashion from an end of said side wall up to said corresponding lateral orifice,
   wherein the cavity comprises lateral delimitations which are inclined in relation to the plane formed by the axis of said corresponding lateral orifice and said insertion direction, in a decreasing fashion from the end of said side wall up to said corresponding lateral orifice.

2. The assembly according to claim 1, wherein the lateral orifices of the adapter are arranged facing each other on a common axis.

3. The assembly according to claim 2, wherein the cylindrical protuberances of the mechanical connector are arranged facing each other on a common axis, which lies parallel to the common axis of the lateral orifices of the adapter.

4. The assembly according to claim 1, wherein the cylindrical protuberances of the mechanical connector and the lateral orifices of the adapter each have a circular cross-section.

5. The assembly according to claim 1, wherein the inner inclined surface of the cavity provided in each side wall and lateral delimitations of said cavity are symmetrical in relation to a plane passing through the axis of the corresponding lateral orifice and the insertion direction of said cylindrical protuberances.

6. The assembly according to claim 1, wherein the deformable nature of at least one side wall results from at least one groove provided in the thickness of the side wall.

7. The assembly according to claim 1, wherein
   each cylindrical protuberance being able to be inserted in the corresponding lateral orifice along a predefined insertion direction by deformation of the corresponding side wall, wherein
   the end of each cylindrical protuberance has at least one portion which is inclined in relation to said insertion direction, towards the inside of said adapter, and
   wherein the portion of each side wall, on which the corresponding cylindrical protuberance is intended to rest when inserted in the corresponding lateral orifice, has a cavity, at least one inner surface of which is inclined in an increasing fashion from the end of said side wall up to said corresponding lateral orifice, and of which at least one lateral delimitation is inclined in relation to the plane formed by the axis of said corresponding lateral orifice and said insertion direction, in decreasing fashion from the end of said side wall up to said corresponding lateral orifice.

8. An assembly for a wiping system, said wiping system comprising a blade and an arm which is extended by an end piece, said assembly comprising:
   a mechanical connector integral with said blade; and
   an adapter able to be connected to said end piece and to said mechanical connector, said adapter comprising two deformable side walls each with a lateral orifice, said mechanical connector comprising two cylindrical protuberances via which said mechanical connector is able to be housed at least partly inside said adapter along an insertion direction, wherein:
   an end of at least one cylindrical protuberance has at least one portion which is inclined in relation to said insertion direction, and
   at least one side wall has a cavity comprising an inner surface which is inclined in increasing fashion from an end of said side wall up to said corresponding lateral orifice,
   wherein the mechanical connector comprises a central part from which the two cylindrical protuberances protrude, a cylindrical shoulder being interposed between the central part and each cylindrical protuberance.

9. An assembly for a wiping system, said wiping system comprising a blade and an arm which is extended by an end piece, said assembly comprising:
   a mechanical connector integral with said blade; and
   an adapter able to be connected to said end piece and to said mechanical connector, said adapter comprising two deformable side walls each with a lateral orifice, said mechanical connector comprising two cylindrical protuberances via which said mechanical connector is able to be housed at least partly inside said adapter along an insertion direction, wherein:
   an end of at least one cylindrical protuberance has at least one portion which is inclined in relation to said insertion direction, and
   at least one side wall has a cavity comprising an inner surface which is inclined in increasing fashion from an end of said side wall up to said corresponding lateral orifice,
   wherein the adapter comprises at least two locking elements, each consisting of a telescopic button arranged at one end of a flexible tab, to lock the adapter in relation to the end piece, said tabs being arranged so as to overlap on operation of the telescopic buttons.

* * * * *